Aug. 22, 1967

W. B. LYON 3,337,664

METHOD AND APPARATUS FOR FORMING THERMOPLASTIC
ARTICLES OF UNUSUAL CONFIGURATION

Filed May 5, 1965

INVENTOR.
Wayne B. Lyon
BY
His Att'ys

INVENTOR.
Wayne B. Lyon
BY
His Att'ys

Aug. 22, 1967
W. B. LYON
3,337,664
METHOD AND APPARATUS FOR FORMING THERMOPLASTIC
ARTICLES OF UNUSUAL CONFIGURATION
Filed May 5, 1965
3 Sheets-Sheet 3
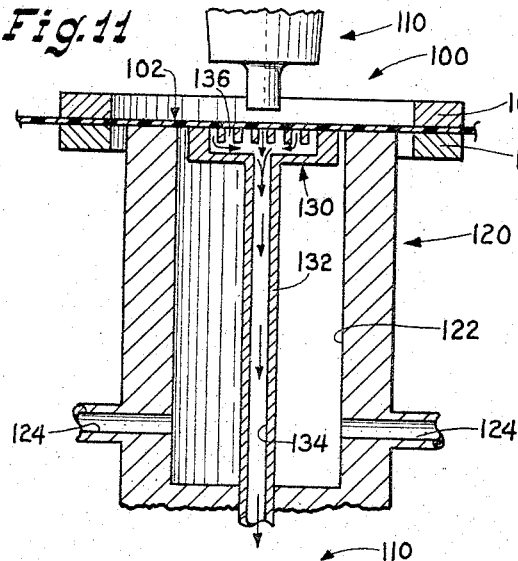
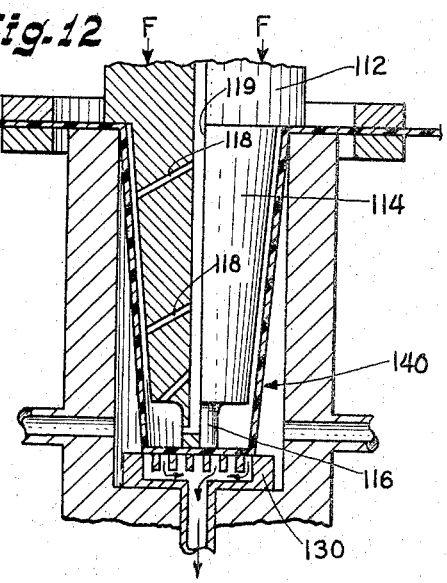
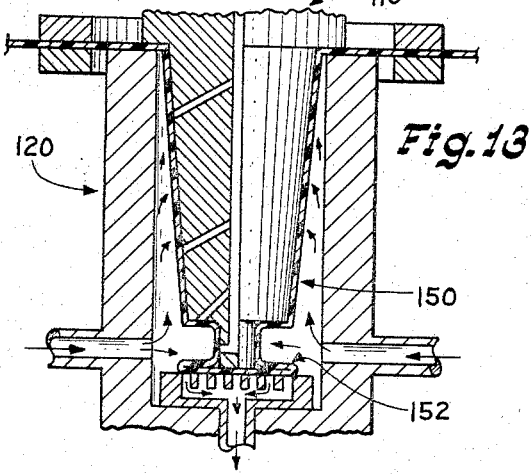
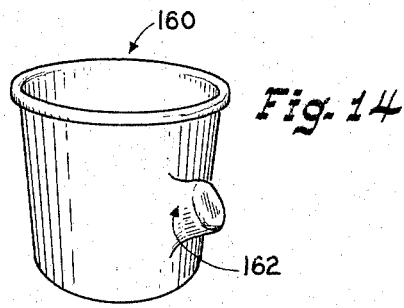
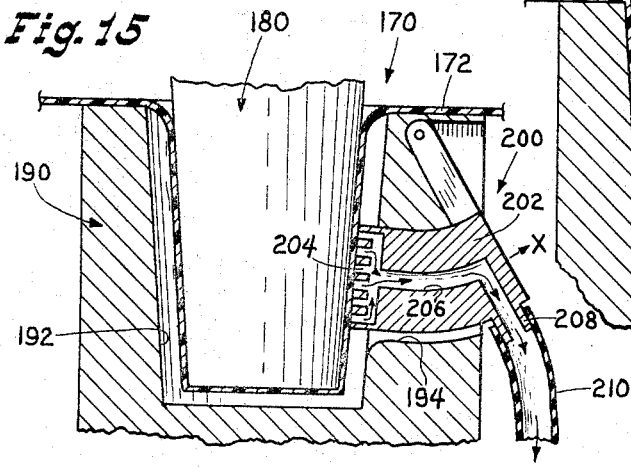
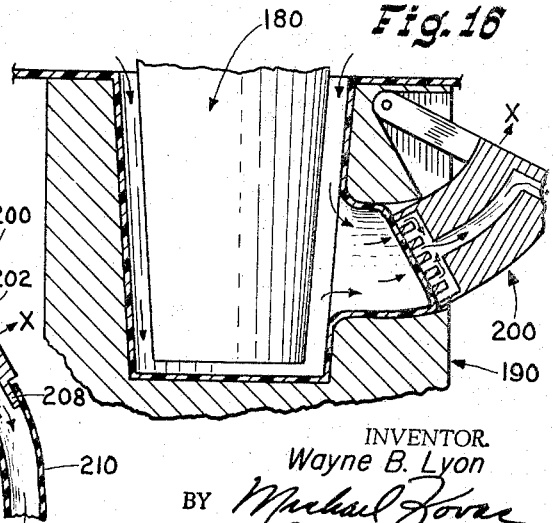
INVENTOR.
Wayne B. Lyon
BY
His Att'ys

United States Patent Office 3,337,664
Patented Aug. 22, 1967

3,337,664
METHOD AND APPARATUS FOR FORMING THERMOPLASTIC ARTICLES OF UNUSUAL CONFIGURATION
Wayne B. Lyon, Deerfield, Ill., assignor to Illinois Tool Works Inc., Chicago, Ill., a corporation of Delaware
Filed May 5, 1965, Ser. No. 453,337
12 Claims. (Cl. 264—89)

The present invention relates to a novel method and apparatus for forming thermoplastic articles, and more particularly, to a method and apparatus for forming relatively deep undercuts, ribs and other similar constructions in a plastic article.

Prior art techniques for forming undercut or reverse bend sections have depended principally upon the use of expanding collets and split mold parts. For a variety of reasons including difficulty of manufacture and the necessity of precision in use, these techniques have not been entirely satisfactory for repetitive, fast cycle operations.

Recent trends in molding thermoplastic articles indicate that the thermoforming approach is the most expedient from both an economical and ease of manufacturing standpoint. Generally speaking, this particular approach deals with molding of articles from a heated web of thermoplastic material by using such methods as straight forming, drape forming, plug-assist forming, etc. Most, if not all of these methods, are limited in the size of undercut or reverse bend section since the undercut cannot be so large that stripping of the articles from the apparatus would be difficult. In addition, under present thermoforming techniques not employing split molds or expanding collets, articles of complex shapes and unusual configurations cannot be formed.

There have been several recent developments which are variations of the thermoforming technique, and rely upon the use of cooled mold portions which impinge upon selective areas of a web and rigidify the same so that the uncooled portions can be folded to form an undercut or reverse bend section. These approaches are disclosed in copending application Nos. 285,463, filed June 4, 1963, now Patent No. 3,284,553 and 430,055, filed Feb. 3, 1965, which are assigned to the same assignee of the present invention. This invention is generally similar to these most recent approaches in the sense that it does not utilize expanding collets or split molds to form relatively deep undercuts or reverse bend sections in an article. In particular and as will be evident from the discussion that follows, this invention utilizes differential air pressure, with or without plug means, in forming complex and unusual configurations in a thermoplastic article.

It is, therefore, an object of the present invention to provide a novel method and apparatus for forming very severe undercuts in thermoplastic articles.

Another object of the present invention is the provision of a method and apparatus which adopts a vacuum-pressure technique in forming complex shapes in a thermoplastic article.

Yet another object of the present invention is to provide a method and apparatus which will permit the formation of one or more undercuts in a plastic article, and which may be in the same or different planes.

A still further object of the present invention relates to a novel method and apparatus which accomplishes the foregoing objects without the formation of unsightly and undesirable mold parting lines.

Still another object of the present invention is to provide a method and apparatus which can be used to form a variety of thermoplastic articles of different size and shape.

Still another object of the present invention is the provision of a method and apparatus which accomplishes the foregoing objectives without complex tooling and in a minimum of time.

A further object of the present invention is to provide a fast, repetitive and economical method and apparatus for forming complex shapes in molded articles.

Other objects and advantages will become apparent from the following description when read in conjunction with the accompanying drawings wherein:

FIGS. 11–13 are sequential semi-diagrammatic views illustrating the manner in which another form of apparatus is used to form a different type of article;

FIG. 14 is a perspective view of a container with an integral handle which is formed in accordance with the method and apparatus shown in FIGS. 15–16; and FIGS. 15–16 are sequential semi-diagrammatic sectional views showing the method and apparatus for forming the article shown in FIG. 14.

Figure 1:
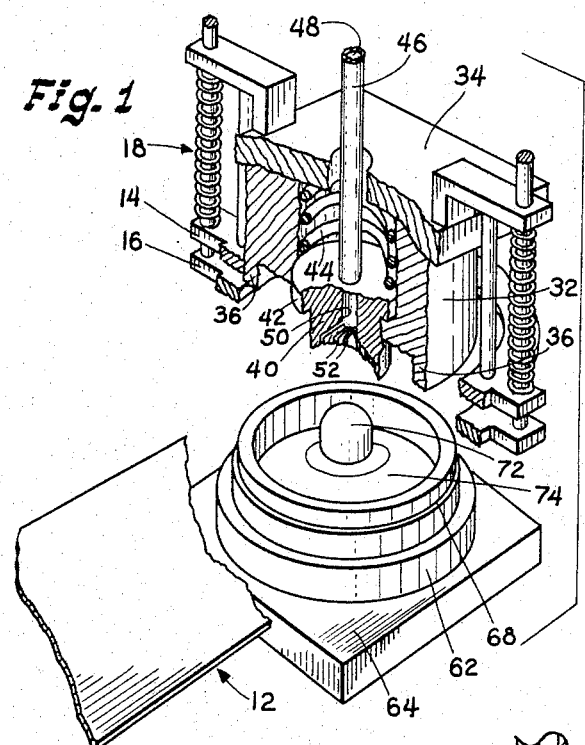
FIG. 1 is a fragmentary perspective view, partially in section showing the significant portions of one form of apparatus which may be utilized in accordance with the teachings of the present invention.
Figure 2:
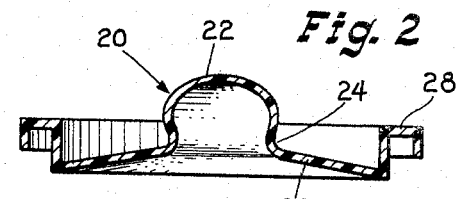
FIG. 2 is a sectional view of a lid or closure member which is formed by the apparatus shown in FIG. 1.
Figure 3:
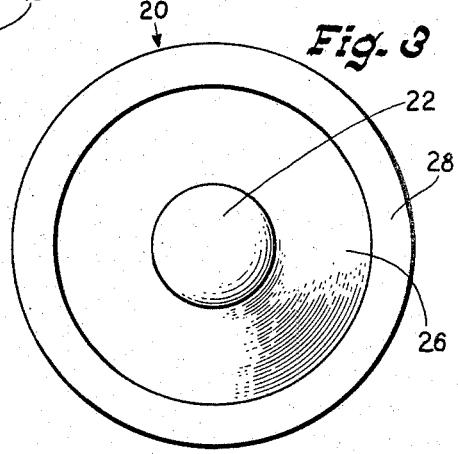
FIG. 3 is a top plan view of the article shown in FIG. 2.

Referring now to the drawings, and first to FIGS. 1–4, there is shown apparatus 10 for molding from a heated web of thermoplastic material 12, a lid or closure member 20. The lid or closure member 20 has an outwardly protruding knob 22 of bulbous shape and is formed with and undercut 24 at its lowest extremity. While this form of the invention deals with the formation of the undercut 34 or the like, it will be observed that an inclined bottom wall 26 and a rim or lip portion 28 may also be formed on the article 20 by the apparatus shown in FIGS. 1 and 4.

The heated web of thermoplastic material 12 may be polyethylene, polystyrene or other well-known thermoplastic substances. This web 12 is initially extruded into sheet form, and intermittently fed past a heating station where it is heated to the forming temperature of the web, and then to a forming station where the apparatus generally designated by the numeral 10 is employed. Upper and lower annular clamp means 14, 16, which are here shown as being secured to the upper mold means 30, are provided for clamping the web on opposite sides thereof to aid in the forming operation as is well-known in the art. The floating mounting 18 for the upper and lower annular clamp means 14, 16 is specifically shown and described in U.S. Patent No. 2,962,758 and enables the clamp means to engage the web before and during the molding operation. It will be appreciated that other clamping arrangements are possible and are contemplated.

The apparatus 10 has upper and lower mold means 30, 60 respectively on opposite sides of the web. Upper mold means 30 has an outer mold element 32 which is attached or otherwise suitably secured adjacent the upper platen 34. A depending flange 36 extends downwardly from the lower face of mold element 32 and cooperates with a portion of lower mold means 60 in a desired manner to be described below. A radially inwardly extending shoulder 38 is offset from the inner periphery of the annular mold element 32 and underlies the circular flange 42 of inner mold element 40. Coil spring 44 is positioned within the bore 35 of the outer mold element 32 and is in compressed relation between the lower face of the upper platen 34 and the upper face of the circular flange 42 to maintain the inner mold element 40 in the position shown in FIG. 4 of the drawings.

Figure 4:
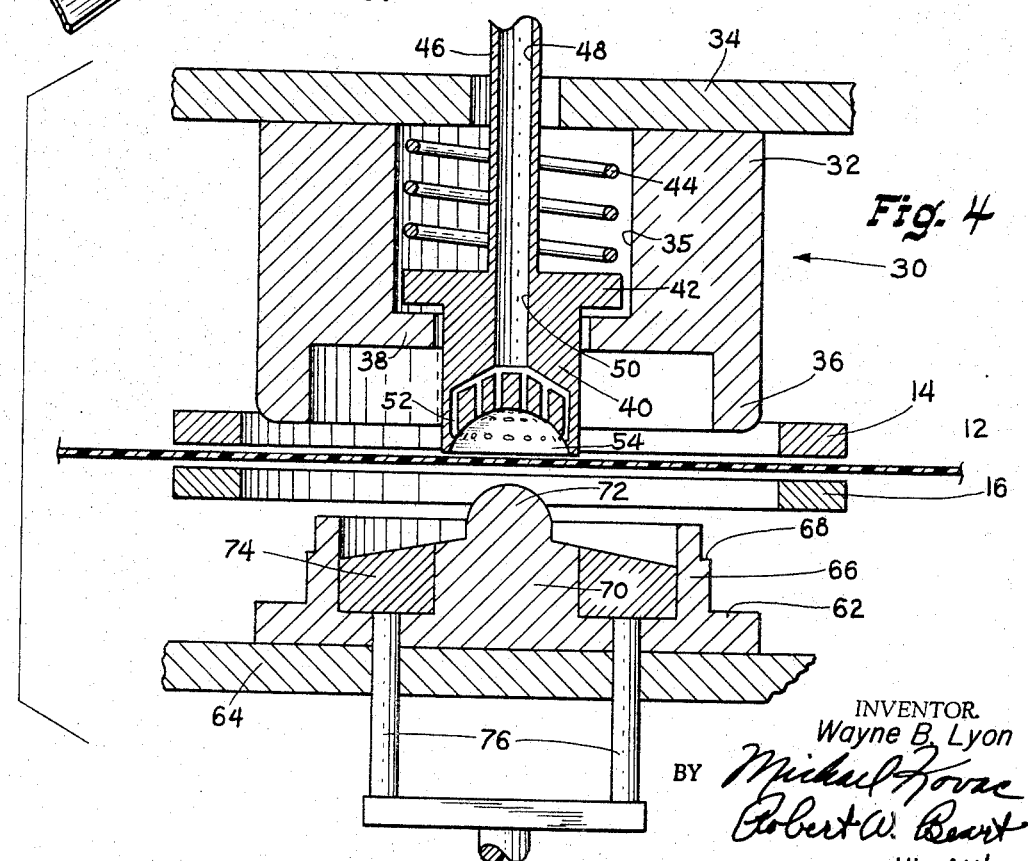
FIG. 4 is a relatively enlarged semi-diagrammatic sectional view of the apparatus shown in FIG. 1.

A hollow shaft 46 is integrally or otherwise secured to the inner mold element 40 so as to connect a suitable vacuum source (not shown) therewith. Shaft 46 may also be used in advancing the inner mold element between the lower face of the upper platen 34 and the inwardly extending shoulder 38 of outer mold element 32. The bore 48 of shaft 46 communicates with the passageway 50 formed in the inner mold element 40, the latter in turn communicating with the ports 52 extending therebetween and the lower face 54 of the inner mold element. As best seen in FIG. 4, the lower face 54 of the inner mold element is preferably concave to aid in forming the knob portion 22 of article 20.

The lower mold means 60 has, as a part thereof, mold member or element 62 which rests against and is supported by the lower platen 64. An upwardly projecting portion 66 of mold element 62 is substantially annular in form, and is provided with a clamping cutoff shoulder 68 which cooperates with the depending flange 36 of the upper mold means 30 as will subsequently appear. A centrally positioned boss 70 also extends in an upward fashion and terminates in a convex portion 72 which is complementary to, but preferably smaller than the concave face 54 of the inner mold element 40. This convex portion may extend upwardly beyond the projecting portion 68 as shown in the drawings or may be aligned with or positioned below other parts of the lower mold means 60. A relatively movable base mold portion 74 having independent actuator means 76 surrounds the centrally positioned boss 70, and is used to eject articles from the mold.

Reference is now made to FIGS. 5–9 which show the various molding stages of the above described apparatus. The molding cycle is begun by indexing or feeding a heated portion of the web 12 between the upper and lower mold means 30, 60. The web 12 is clamped on opposite sides thereof by the upper and lower clamp means 14, 16, the mold means held at fixed predetermined distances from the web. It will be observed that clamp means 14, 16 clamp the web just outside of the peripheries of the upper and lower mold means to define a predetermined area of the web from which the article 20 will be formed.

Figure 5:
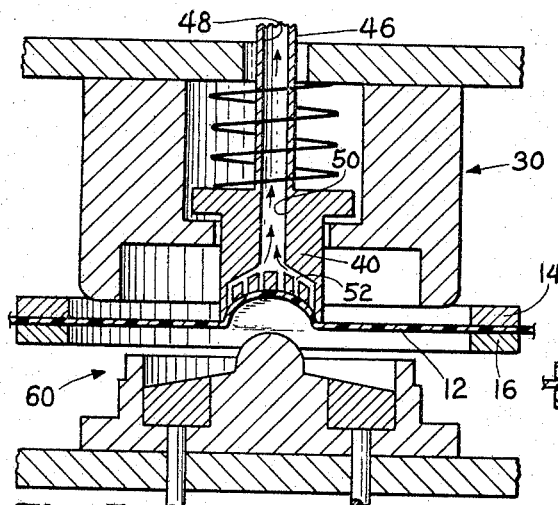
FIGS. 5–9 are sequential semi-diagrammatic sectional views illustrating the operation of the apparatus shown in FIGS. 1–4 for forming the article shown in FIGS. 2–3.
Figure 6:
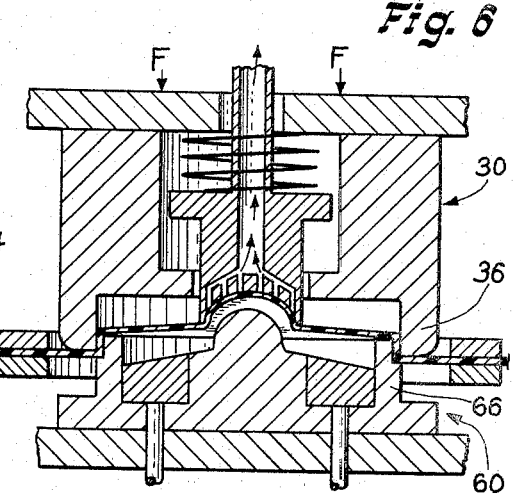

Prior to or simultaneously with the advancement of the mold means 30, 60 toward each other, a differential air pressure is created across the predetermined area of the web to draw material in a first direction. This is preferably accomplished by establishing a vacuum within the bore 48 of shaft 46 to draw air upwardly through the ports 52 and passageway 50 of the upper inner mold element 40. This vacuum should be sufficiently great so that a portion of the clamped web will be drawn upwardly and against the concave lower face 54 of the inner mold element 40 as seen in FIG. 5 of the drawings. In most cases, it will only be necessary to position the inner mold element 40 close to the web since any small gap therebetween will not destroy the effect of the vacuum. Obviously, in certain instances it may be desirable to first position the inner mold element into contact with the web prior to establishing the vacuum to reduce the amount of pressure needed to draw the material upwardly into the inner mold element 40. Substantially simultaneously with the establishment of the vacuum or as soon as conveniently possible thereafter, the mold means are advanced toward each other. In FIG. 6 of the drawings, the upper mold means 30 is shown as being advanced toward the lower mold means 60, but it will be understood that either one or both of the mold means may be advanced toward one another. Actuator or drive means for advancing the mold means or parts thereof are shown diagrammatically here by the arrows F. The movement of the mold means toward each other will position a portion of the web between the dependent flange 36 and the upwardly projecting portion 66 so as to seal off a predetermined area of the web from the remainder thereof.

Figure 7:
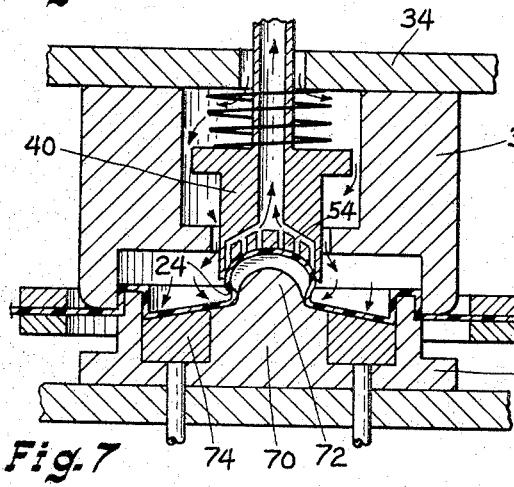

Then, with the vacuum still on and a predetermined material area sealed off from the remainder of the web, a differential air pressure is established across areas of the web lying outside of the material area held in a substantially fixed position within the inner mold element 40. As seen in FIG. 7 of the drawings, this differential air pressure may be created by introducing a positive fluid pressure through the upper mold means as indicated by the arrows. (It will be observed that the openings in the outer mold element 32 and the upper platen 34 which surround the inner mold element 40 and the shaft 46 are slightly larger than the mold parts to permit the introduction of this fluid pressure.) The creation of this differential air pressure will position portions of the web, lying outside of the portion held by the vacuum, against various parts of the lower mold means. This is depicted in FIG. 7 of the drawings wherein portions of the web are positioned against the upper face of the lower mold element 62 including the centrally positioned boss 70, and the base mold portion 74.

Since the convex portion 72 of the centrally positioned boss 70 is complementary to, but smaller than the concave face 54 of the upper inner mold element 40, the portion of the web immediately adjacent the inner mold element 40 will be deflected inwardly toward and into contact with the convex portion 72 so as to form the undercut 24.

Figure 8:
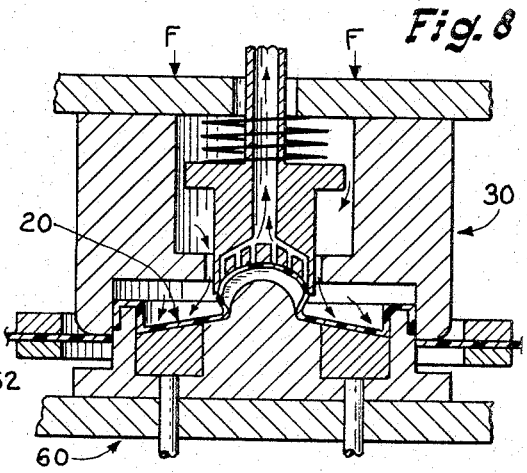
Figure 9:
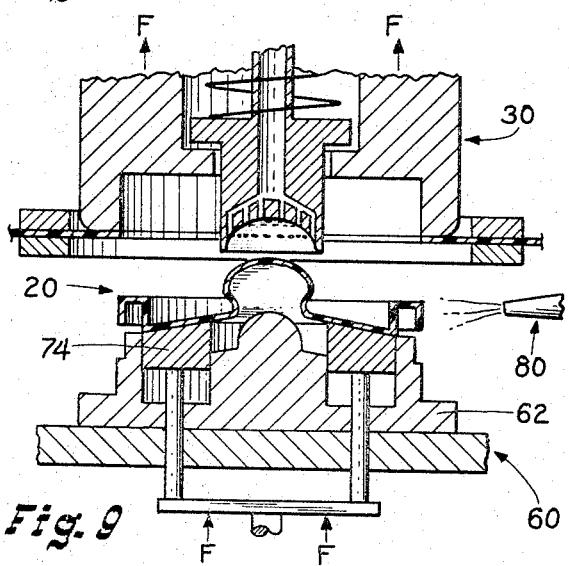

The final molding stages may now take place including a further advance of the mold means toward each other to sever the article 20 from the remainder of the web as is shown in FIG. 8 of the drawings, and then the mold means may be retracted as seen in FIG. 9 with the base mold portion 74 moving the article 20 upwardly to strip it from the lower mold 62 and permit it to be ejected from the apparatus by an air jet 80 or other suitable article removal means.

The article 20 which is formed provides an outwardly protruding knob 22 of exceptionally bulbous shape with an undercut 24 so as to facilitate manual grasping of the article 20 in applying or removing the same from a complementary container. An article of this shape was heretofore obtainable, if at all, only by extremely slow and tedious processes. According to this particular form of the invention, however, such an article may be obtained in an extremely rapid and efficient manner as will now be apparent.

The present invention is not limited to forming articles of this particular shape, but may be used, as desired, to form articles of unusual or complex shapes. For example, it may be desired to form a lid member of the type shown in the embodiment of FIG. 10, a parfait cup or container as shown in FIG. 13, a seamless container with a handle as shown in FIG. 14, and the like. These and other articles, as well as variations in the method and apparatus which are needed to produce such articles, are within the purview of the present invention. The discussion that follows will be directed to variations in the method and apparatus for forming the articles shown in FIGS. 10, 13 and 14.

Figure 10:
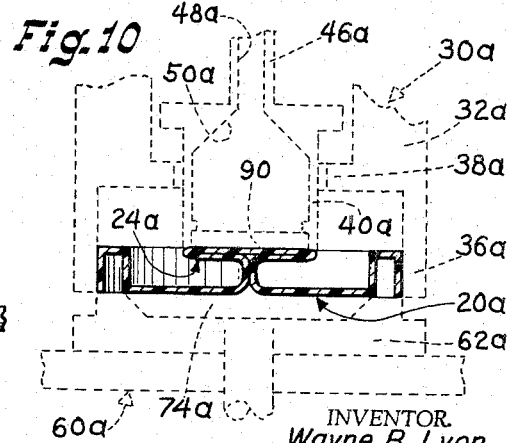
FIG. 10 is a sectional view showing a slightly modified form of article which is formed by the apparatus shown in phantom lines.

The embodiment shown in FIG. 10 of the drawings is generally similar to the one just described as indicated by the application of identical reference numerals with the suffix "a" employed to designate like parts. It will be noted that the article 20a is formed with an extremely severe undercut 24a in the knob portion thereof, the top face of this knob portion being substantially planar in form. To produce this particular configuration, the upper inner mold element 40a is provided with a porous or perforated member 90 which communicates with the passageway 50a and the bore 40a of the hollow shaft 46a.

The lower face of the member 90 is substantially planar in form so that when a vacuum is established through bore 48a and thence through passageway 50a and the openings of member 90, a portion of the material will be drawn thereagainst. Then, while the vacuum is still on, a differential air pressure is created across other areas of the web lying outside of the fixed material portion to cause a part thereof to fold underneath this fixed material portion to the position shown, while other parts are positioned against the lower mold element 62a in the same manner as previously discussed. Preferably, this differential air pressure is established by a positive fluid pressure through the upper mold means 30a in the same manner as the above described embodiment. It will be noted that in folding a part of the material underneath the fixed material portion, the differential air pressure will necessarily have a component of force in a direction substantially normal to the direction in which the fixed material portion is first drawn in order to form the undercut. The remaining molding stages are similar to those described in connection with the FIGS. 1-9 embodiment, including the severing of the article from the web and the removal of the aritcle from the molding apparatus. In both the embodiments just described, it may be desirable to sever the article or articles at a subsequent station, and this is within the purview of the present invention.

A slightly modified form of apparatus is shown in FIGS. 11-13, and although based on the principles disclosed herein, it is used to form the parfait cup or container shown in FIG. 13 of the drawings. The apparatus 100 shown in these figures, in addition to having upper and lower mold means in the form of a male or plunger member 110 and a female mold 120, is provided with a reciprocating suction head 130 positioned within and moving back and forth along the the axis of the female mold 120. Prior to the actual forming operation, the web of heated plastic material 102 is first clamped by upper and lower clamp means 104, 106 respectively which surround the plunger 110 and female mold 120. The suction head 130 is then moved adjacent the lower face of the heated web 102 or has already been so positioned adjacent the lower web face. The movement of the suction head 130 is accomplished by any suitable means (not shown) which is connected to the hollow tube 132 of the suction head.

In most instances, it is preferable to employ a substantially continuous vacuum created by suitable suction producing apparatus (not shown) to eliminate the necessity of a complex valving arrangement. Thus, when the suction head 130 is moved adjacent the lower face of web 102, the web will be pulled by the suction into contact with the upper face of the suction head 130. This is essentially the condition shown in FIG. 11 of the drawings wherein the arrows indicate the establishment of a vacuum through the perforated face 136 of the suction head and thence through the bore 134 of hollow tube 132.

After the web has been pulled into contact with the suction head 130, the suction head is moved downwardly to draw a predetermined area of the web into the cavity 122 of the female mold 120. This movement is continued until the lower face of the suction head 130 abuts the bottom of the cavity as shown in FIG. 12 of the drawings. At this point, an intermediate article 140 having a bottom wall and an outwardly flaring side wall is formed as seen in FIG. 12 of the drawings.

The mandrel or plunger member 110 is then advanced downwardly within the cavity 122 of the female mold 120. It will be apparent that the movement of the mandrel 110 may take place either substantially simultaneously with the movement of the suction head 130 toward the bottom of the cavity or after the intermediate article 140 has been formed. The mandrel or plunger member 110 has a generally cylindrical portion 112 with a diametrical extent slightly larger than the open mouth of the cavity 122, a frusto-conical intermediate portion 114 joined to cylindrical portion 112 and extending downwardly therefrom, and a reduced substantially cylindrical end portion 116 which has a diameter substantially smaller than the smallest side wall diameter of the intermediate article 140. As best seen in FIG. 12, the mandrel 110 is so positioned within the female mold 120 that the reduced end portion 116 is located adjacent the lower side wall portion of intermediate article 140 and in contact with the bottom wall thereof. It will also be noted that the frusto-conical intermediate portion 114 of the mandrel is of a size smaller than the outwardly flaring side wall of the intermediate article.

With the bottom wall portion of the intermediate article 140 maintained in a substantially fixed position by the suction head 130, a differential fluid pressure is established across the side wall portions of the intermediate article to cause it to conform to the shapes of the intermediate and reduced end portions 114, 116 respectively of the mandrel. This is preferably accomplished by introducing a positive fluid pressure within the openings 124 of the female mold. In such a case, passageways 118 communicate with central opening 119 formed in the mandrel to bleed air or fluid pressure trapped between the mandrel and the intermediate article. Alternatively, a vacuum may be established within the central opening 119 and thence through the passageways 118 of the mandrel to cause the side walls of the intermediate article to conform to those portions of the mandrel disposed within the cavity of the female mold.

Whichever approach is employed, the differential fluid pressure established across the side wall portions of the intermediate article will form an article 150 as seen in FIG. 13 which is commonly known in the trade as a parfait cup or container. It will be noted that this particular article has a relatively deep undercut 152 just as in the other embodiments. The various fluid pressures are now turned off in order to permit the suction head 130 to serve as an ejecting mechanism in removing the article 150 from the female mold. The article 150, which is still attached to the web, can then be transported to a severing station where it is separated from the remainder of the web. Although not specifically shown, it would also be possible to sever the article 150 from the web in a manner similar to the above described embodiments.

With the exception of releasing the vacuum during the article removal, the suction established through the suction head 130 will be essentially continuous. Suitable control means must, however, be employed to actuate the suction producing apparatus and permit the establishment of a vacuum at the moment a new web portion is indexed between the plunger 110 and a female mold 120. Such control means are conventional, and form no part per se of the present invention.

Referring now to FIGS. 14-16 for a slightly modified form of the invention, it will be seen that a one-piece seamless container 160 with an integral handle 162 may be formed by employing the modified apparatus 170 shown in FIGS. 15-16 of the drawings. This particular apparatus also employs a plunger or mandrel 180 and a female mold 190 having a cavity generally complementary to the shape of the plunger, but slightly greater in size. The female mold 190 is, however, in this instance of the split mold variety, that is, it has two or more sections which when associated with each other form the cavity 192, and when separated, permit article removal.

In forming the article 160, the mandrel 180 and female mold 190 are relatively advanced toward one another by conventional means to mechanically draw a predetermined area of the heated web 172 into the cavity 192 of the female mold. (Although not specifically shown, the web 172 is also preferably clamped around the periphery of the mold members just as in the other embodiments.)

Suction head 200 which is pivotally attached to the female mold 190 and is located within a complementary opening 194 thereof is then actuated by suitable means, here shown diagrammatically by letter X, to draw a side wall portion of an intermediate article, formed by the relative advance of the mandrel and female mold 180, 190 respectively, in a first direction from the position shown in FIG. 15 to that in FIG. 16. The carrier portion 202 of the suction head has a perforated face 204 which communicates with the channel 206 thereof. A cylindrical sleeve element 208 depends from the carrier portion 202 for attachment of the flexible tube 210 thereto. The flexible tube 210 runs between the carrier portion 202 and suitable suction producing apparatus (not shown). In the particular form of apparatus shown, the outer periphery of the carrier portion 202 is generally curvilinear in shape to permit it to freely move within the complementary opening formed in the female mold 190. Thus, it will be apparent that the suction head 200 may oscillate between the position shown in FIGS. 15–16 to draw a side wall portion of the intermediate article in the complementary opening 194 of the female mold.

A differential fluid pressure is next created across the remaining portions of the intermediate article to expand them against the marginal portions surrounding the cavity of the female mold. As shown in FIG. 16, this is attained by a positive fluid pressure introduced between the mandrel and the intermediate article, although a vacuum may also be used if desired. One advantage of using a positive fluid pressure is that it will aid in forming the handle 162, and thus reduces the amount of suction force.

With the parts in the position shown in FIG. 16 of the drawings, the various sections of the female mold 190 are then separated from each other to permit the removal of the article positioned therein. As in the other embodiments, the article 160 may be severed from the web while it is in a deforming position or at a subsequent trimming station.

From the foregoing, it will now be appreciated that the present invention contemplates a unique method and apparatus for forming thermoplastic articles of unusual configuration. In most of the embodiments described, it has been shown that relatively deep undercuts or reverse bend sections can be formed without the necessity of using the split mold or expanding collet techniques. In any case, the principles serving as a base for the present invention permit rapid, economical molding of complex thermoplastic shapes in a practical and efficient manner.

Although specific embodiments have been shown and described, it is with full awareness that many modifications thereof are possible. The invention, therefore, is not to be restricted except insofar as is necessitated by the prior art and by the spirit of the appended claims.

I claim:
1. A method of forming an undercut in a plastic article comprising the steps of heating a web of thermoplastic material to its forming temperature, creating a first pressure differential across a predetermined area of said web to draw material in a first direction, maintaining at least a portion of said drawn material in a substantially fixed position by said first pressure differential, and creating a second pressure differential across other predetermined areas of said web lying outside of the fixed material portion which is greater than said first pressure differential to draw material in a second direction which is substantially normal to said first direction leaving the fixed material portion unaffected to cause at least a portion of said other predetermined areas to fold under said fixed material area and provide the undercut on an article.

2. A method of forming a relatively deep undercut in a plastic article from a heated sheet of thermoplastic material, comprising the steps of creating a first pressure differential across a predetermined area of said web to draw material in a first direction and upon conclusion of the drawing maintaining said predetermined area in a substantially fixed position by said first pressure differential, and thereafter creating a second pressure differential which is greater than said first pressure differential in other predetermined areas of said web lying outside of said fixed predetermined area to draw the same in a second direction which is substantially normal to said first direction and cause at least a portion of said other predetermined area to fold relative to said fixed predetermined area and provide an undercut on an article.

3. A method of forming relatively deep undercuts in articles made from a heated sheet of thermoplastic material disposed between opposing mold members, comprising the steps of creating a vacuum through one of said mold members across a predetermined area of said web to draw it in a first direction, maintaining at least a portion of said predetermined drawn area in a substantially fixed position by said vacuum, and thereafter creating a positive fluid pressure against a sheet material area lying outside of said fixed material area which is greater than said vacuum and in a second direction extending substantially normal to said first direction to cause said other sheet material area to fold underneath the fixed material area and form an undercut in said article.

4. The method of forming a relatively deep undercut in a plastic article from a sheet of heated thermoplastic material comprising, supporting the heated thermoplastic sheet in alignment with and between opposed mold members disposed on opposite sides of said sheet, clamping opposite sides of the sheet in a circumferential manner outside of said mold members, sealing off a predetermined material area from the remainder of the sheet, establishing a first pressure differential through one of said mold members to draw at least a portion of said predetermined area in a first direction, maintaining at least a portion of said drawn material area in a substantially fixed position by said first pressure differential, and thereafter creating a second pressure differential also through one of said mold members and across the remaining portions of said predetermined area to position the material against one of said mold members to form an intermediate article, said second pressure differential being greater than said first pressure differential and having a component of force extending substantially normal to said first direction to form an undercut in said intermediate article, and thereafter severing the article so formed from the remainder of the web to form the ultimate article.

5. The method of forming a parfait container from a heated web of thermoplastic material, comprising the steps of creating a first pressure differential across a predetermined area of said web and drawing said predetermined area into an intermediate article shape having a bottom wall and a peripherally continuous side wall extending upwardly and outwardly therefrom, maintaining the bottom wall of said intermediate article in a substantially fixed position by said first pressure differential, inserting a mandrel member within the intermediate article, said mandrel having a size and shape generally similar to, but smaller than the side wall of said intermediate article and terminating in a reduced portion of lesser dimension than said fixed bottom wall adjacent a lower side wall portion of the intermediate article, creating a second pressure differential across the intermediate article which is greater than said first pressure differential to cause the side wall thereof to conform to the shape of said mandrel and its reduced portion, and thereafter severing the article so formed from the remainder of the web to form the ultimate article.

6. The method as defined in claim 5 including the step of withdrawing the mandrel from the intermediate article after the establishment of said second pressure differential.

7. Apparatus for forming an undercut in a plastic article from a heated web of thermoplastic material, comprising means for creating a first fluid pressure differential across a predetermined area of said web to draw material in a first direction and for maintaining at least a portion of said drawn material in a substantially fixed position, and means for thereafter creating a second pressure differential which is greater than said first pressure differential across other predetermined areas of said web lying outside of the fixed material portion to draw the material in a second direction extending substantially normal to said first direction and cause said other predetermined areas to fold under said fixed material portion and provide an undercut on an article.

8. Apparatus for molding undercuts in articles from a heated web of plastic material comprising first fluid pressure means for drawing a predetermined area of material in a first direction and maintaining at least a portion of said drawn material in a substantially fixed position, and second fluid pressure means greater than said first fluid pressure means for drawing other predetermined areas of said web lying outside of the fixed material portion in a second direction extending substantially normal to said first direction to cause material to be drawn underneath said fixed material portion and provide an undercut.

9. Apparatus for molding undercuts in articles from a heated web of plastic material comprising clamp means for clamping said web, first and second opposed mold means disposed on opposite sides of the heated web of material and located interiorly of said clamp means, one of said mold means being associated with a vacuum source for drawing a predetermined area of said web in a first direction and for maintaining at least a portion of said drawn material in a substantially fixed position, and one of said mold members being associated with a positive fluid pressure source which is greater than said vacuum source to draw other predetermined areas of said web lying outside of the fixed material portion in a direction away from and inwardly of said fixed material portion to form an undercut.

10. The apparatus as set forth in claim 9 wherein said mold means associated with a vacuum source includes a mold element having a passageway and a perforated face through which air is drawn.

11. The apparatus as set forth in claim 9 wherein said perforated face is concave in shape and is complementary to, but of a predetermined larger size than a concave mold portion aligned therewith on an opposite side of said web to facilitate the formation of an outwardly protruding knob with an undercut.

12. Apparatus for forming a parfait container from a heated web of thermoplastic material comprising a mold having a cavity, means disposed within said mold cavity for creating a pressure differential across a predetermined area of said web and for drawing said predetermined area within the mold cavity to form an intermediate article having a bottom wall and a side wall extending upwardly and outwardly therefrom, a mandrel disposed opposite to said mold and having a size and configuration similar to, but smaller than said intermediate article and terminating in a reduced portion having a smaller dimension than said bottom wall, means for inserting the mandrel and its reduced portion within the intermediate article to position said reduced portion adjacent a lower wall portion of said intermediate article, said first pressure differential maintaining the bottom wall of said intermediate article in a substantially fixed position, and means creating a second pressure differential which is greater than said first pressure differential across the side wall of said intermediate article to position it against the mandrel and its reduced portion, means for relatively moving the mandrel and mold away from each other to permit removal of the article formed within the mold cavity, and means for severing the article so formed from the remainder of the web.

References Cited
UNITED STATES PATENTS

| | | | |
|---|---|---|---|
| 2,702,411 | 2/1955 | Winstead | 264—89 |
| 2,973,558 | 3/1961 | Stratton | 264—89 |
| 2,990,581 | 7/1961 | Rowe | 264—89 |
| 3,105,607 | 10/1963 | Edwards | 264—93 |
| 3,235,639 | 2/1966 | Knowles | 264—92 |
| 3,244,780 | 4/1966 | Levey et al. | 264—89 |
| 3,291,874 | 12/1966 | Negoro | 264—92 |

R. B. MOFFITT, *Primary Examiner.*

ROBERT F. WHITE, *Examiner.*

A. R. NOE, *Assistant Examiner.*